United States Patent Office 2,928,783
Patented Mar. 15, 1960

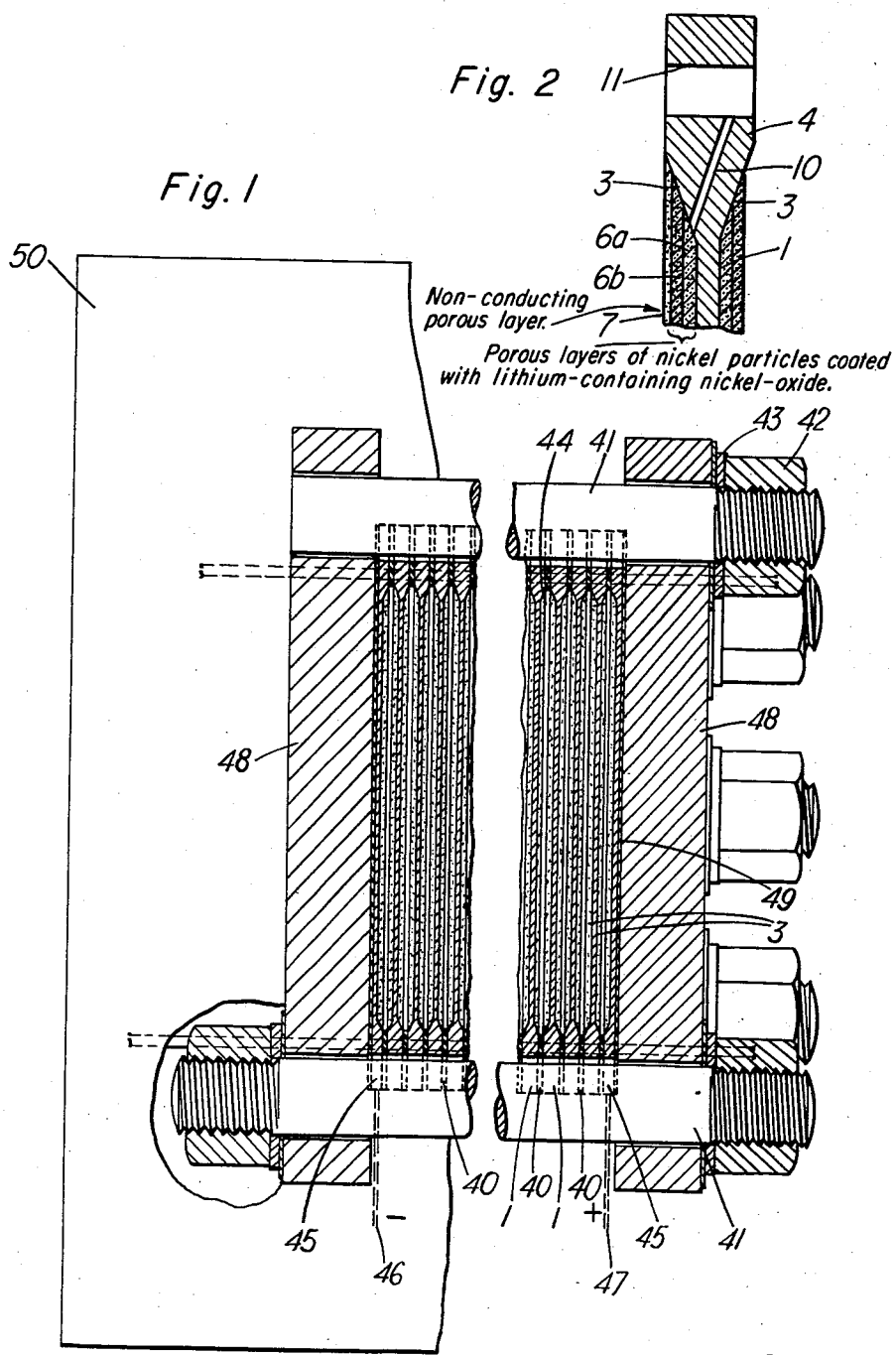

2,928,783
POROUS NICKEL ELECTRODE

Francis Thomas Bacon, Westfield, Little Shelford, England, assignor to E.R.A. Patents Limited, a British company Application August 21, 1957, Serial No. 679,346

Claims priority, application Great Britain August 23, 1956

3 Claims. (Cl. 204—283)

This invention relates to electrolysers, that is to say equipment in which pure oxygen and hydrogen are produced by passing current between metal electrodes in a suitable electrolyte. For efficient operation such electrolysers require to be operated at high pressures and temperatures, thus giving rise to problems caused by corrosion of the electrodes by the electrolyte, and by the oxygen.

The gases are liberated at the surfaces of the electrodes and cause considerable foaming in the body of the electrolyte. In order to prevent the two gases mixing together, it is necessary to provide a porous diaphragm dividing the cell into compartments containing the positive and negative electrodes respectively. In addition, it is necessary to trap the quantities of electrolyte carried in the form of foam by the gases drawn off. The problems of the effective separation of the two gases are increased when operating at high pressures and temperatures and, moreover, the diaphragm along with the other components of the cell becomes susceptible to corrosion.

An object of the invention is to devise an electrolyser construction which is not subject to the foaming of gas in the electrolyte, thereby eliminating the need for a diaphragm.

According to the present invention the electrodes of an electrolyser are made of porous nickel and each electrode has a layer in contact with the electrolyte which has a pore size smaller than that of a layer on the other side, the gases generated being maintained at a slightly higher pressure than the electrolyte so as to force the electrolyte out of the large pores but being prevented from bubbling into the electrolyte by the increased effect of surface tension in the small pores. The positive electrodes at which the oxygen is generated are also formed with a non-conductive coating on the side in contact with the electrolyte and this prevents the oxygen being liberated from the outer surface of the electrode directly into the body of the electrolyte. The result of such a construction is that the gases are both liberated at the backs of the electrodes, that is to say the sides away from the electrolyte and not only is foaming of the electrolyte prevented but the need for a separating diaphragm is removed, thus greatly simplifying the construction of the electrolyser.

The non-conductive coating is found in practice to be required only on the oxygen electrode. Even at quite high current densities it is found that practically all the hydrogen is evolved at the back of the electrode. In the absence of the non-conductive coating, however, a relatively large proportion of the oxygen is given off at the front of the electrode, that is to say in the electrolyte space, and it is for this reason that the non-conductive coating is required.

Preferably, the non-conductive coating is constituted by a layer of the so-called green nickel oxide which is substantially non-conductive. This may be produced, for example, either by the application of a layer of fine nickel powder which is sintered in air so that the nickel particles become coated with green nickel oxide, or alternatively by sintering fine particles of the green nickel oxide which would not then include any metallic nickel. As an alternative to the use of nickel oxide one or two other metallic oxides may also be used for the nonconductive coating. Magnesium oxide, for example, is suitable for this purpose, but most other oxides are unsuitable since they are eventually dissolved by the electrolyte, normally a solution of potassium hydroxide at 200° C.

By eliminating the need for a diaphragm problems of corrosion of this component are avoided but there still remains the difficulty caused by corrosion of the oxygen electrode. The hydrogen electrode is found to stand up to corrosion remarkably well. The conductive portions of the positive or oxygen electrode underlying the nonconductive layer are therefore preferably treated with a solution of lithium compound so that the individual particles are formed with a coating of black lithium-containing nickel oxide. The nickel oxide by itself has good corrosion-resistant properties while the presence of the lithium avoids the large increase of electrical resistance which would otherwise be associated with the oxide coating.

In constructing an electrolyser in accordance with the invention bi-polar electrodes may conveniently be used such as described in more detail in the co-pending application Serial No. 679,457, filed August 21, 1957. These electrodes each comprise a central supporting plate carrying a positive electrode on one face and a negative electrode on the other face with space for passage of gas between the plate and the rear face of each electrode and are assembled together with intermediate insulating packing so as to provide a series of electrolyte spaces.

A construction of electrolyser in accordance with the invention and including electrodes of the kind just mentioned, will now be described in more detail by way of example with reference to the accompanying drawing in which Figure 1 is a sectional view of an electrolyser with part of the central portion broken away, and Figure 2 is an enlarged sectional view of one bi-polar electrode embodying the invention.

The electrolyser shown in Figure 1 of the drawing comprises a number of bi-polar electrodes 1 separated by gaskets 40 of insulating material. This leaves a space 44 between the faces of adjacent electrodes for the reception of the electrolyte which is normally a strong solution of potassium hydroxide. Each bi-polar electrode comprises a central plate 1 having a thickened rim 4 and formed on opposite sides with recesses 3 filled with porous nickel, as described in more detail in the co-pending application referred to above. The positive or oxygen electrodes are formed on their outer faces with a non-conductive coating of nickel oxide, as previously described, and the conductive portions of these electrodes underlying the non-conductive coating are treated with a solution of a lithium compound so that the individual particles are formed with a coating of black lithium-containing nickel oxide, as described in the co-pending application previously referred to. Figure 2 shows the structure of a bi-polar electrode constructed according to said copending application and having a layer of non-conductive material on the outer face of the positive electrode side, according to the present invention. The two porous layers of nickel formed according to the copending application are represented at 6a and 6b, the inner layer 6a being formed of coarser particles than layer 6b and therefore having pores of larger size adjacent the backing plate 1. Porous layers 6a and 6b are formed by sintering layers of nickel particles and, after the two layers have been sintered in position, they are saturated with a solution of lithium hydroxide and, after drying in air at 120° C. are heated to 800° C. for fifteen minutes in a hydrogen-nitrogen mixture, and then finally heated in air at 800° C. for fifteen minutes to oxidize the lithium impregnated layers. The layer 7 in Figure 2 comprises the non-conductive layer covering the outer face of the positive side of the electrode structure which would normally have contact with the electrolyte. As indicated above, the layer 7 may be formed of fine nickel powder which has been sintered in air so that the particles of the layer are coated with green nickel oxide or layer 7 may be formed by a sintered layer of fine particles of green nickel oxide which would not include any metallic nickel, or layer 7 may be formed of magnesium oxide.

The peripheral portions 4 of each electrode central plate, which are, of course, thicker than the central recessed portion, are formed with ports 10 through which the gases evolved are led off from the space between the rear face of the porous nickel and the central supporting plate. These ports lead to passageways 11 formed in rims 4 transverse to the planes of the electrodes. The electrolyte is continuously replenished with pure water by way of a further passageway (not shown), openings from which lead through slots in the gaskets 40 to the electrolyte spaces 44.

During assembly the electrodes and gaskets are clamped together in a stack by means of bolts 41 fitted with nuts 42 at each end. In order to avoid short circuiting the cells the bolts 41 are covered with insulating material while the nuts 42 have insulating washers 43.

Each of the electrodes 1 is bi-polar, as previously described, but at each end of the stack a uni-polar electrode 45 is, of course, required. This is of the same construction as the electrodes 1 except that a recess is formed in only one side of the supporting plate. Electrical conductors 46 and 47 are then led off from these end uni-polar electrodes. Each of the electrodes 45 is backed by a strong plate 48 through which the bolts 41 pass and against which the nuts 42 press. The electrodes 45 are, of course, insulated from the plates 48 by means of insulating packing 49. The whole assembly is enclosed in an outer casing 50, part of which is broken away for purposes of illustration. This casing is filled with heat insulating material to maintain the electrolyser at its operating temperature.

With this construction the electrolyser may be used both at high pressure and high temperature, for example of the order of 600 lbs. per square inch and 200° C. although, of course, it is also useful at normal working temperatures, for example of the order of 75° C. The casing must, of course, be made sufficiently strong to resist the internal pressures used. With a normal construction of electrolyser the gas emerging requires to be compressed up to 2000 to 3000 lbs. per square inch pressure (i.e. the pressure of the storage cylinders) by means of compressors. When operating at the high pressures just mentioned, i.e. of the order of 600 lbs. per square inch, much smaller compressors may be used since the volume of gas will be very much less. If the electrolyser is operated at the full pressure of 2000 to 3000 lbs. per square inch, the compressors may be eliminated completely, but the increased weight of the electrolyser may not render this economical.

The electrolyser just described is reversible in action. In other words, it may be used either as an electrolyser, in which case current must be supplied to the conductors 46 and 47, and oxygen and hydrogen are led off. Alternatively, it may be used as a battery, in which case oxygen and hydrogen are supplied to it and current is taken away from the conductors 46 and 47. This reversible action is of considerable advantage for traction purposes since it enables regenerative braking to be used. Thus instead of using friction braking, energy is passed back to the battery which then operates as an electrolyser to generate hydrogen and oxygen. The gases thus produced are then fed to two small pressure vessels which are permanently at the same pressure as the battery of cells, the gases thus being available for reconversion to electrical energy when required.

I claim:

1. A positive electrode for an electrolyzer comprising a solid backing plate, a porous nickel electrode carried on one face of said plate, the inner layer portion of said porous electrode immediately adjacent the backing plate having a pore size larger than that of the outer layer to provide pore spaces for passage of gas between the backing plate and the denser portion of the electrode, the nickel particles of said porous electrode being coated with conductive lithium-containing nickel oxide, and a porous layer of non-conducting material intimately attached to and covering the outer area of said porous electrode which is to have contact with the electrolyte.

2. An electrode structure according to claim 1 wherein said non-conductive layer comprises a layer of non-conductive green nickel oxide.

3. An electrode structure according to claim 1 wherein said non-conductive layer comprises a layer of non-conductive magnesium oxide.

References Cited in the file of this patent

UNITED STATES PATENTS

| | | |
|---|---|---|
| 2,070,612 | Niederreither | Feb. 16, 1937 |
| 2,384,463 | Gunn et al. | Sept. 11, 1945 |
| 2,716,670 | Bacon | Aug. 30, 1955 |

FOREIGN PATENTS

| | | |
|---|---|---|
| 667,298 | Great Britain | Feb. 27, 1952 |